United States Patent
Noguchi

(10) Patent No.: US 10,703,137 B2
(45) Date of Patent: Jul. 7, 2020

(54) HEAVY DUTY PNEUMATIC TIRE

(71) Applicant: The Yokohama Rubber Co., LTD., Minato-ku, Tokyo (JP)

(72) Inventor: Fumitoshi Noguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 386 days.

(21) Appl. No.: 15/505,899

(22) PCT Filed: Aug. 22, 2014

(86) PCT No.: PCT/JP2014/072059
§ 371 (c)(1),
(2) Date: Feb. 22, 2017

(87) PCT Pub. No.: WO2016/027382
PCT Pub. Date: Feb. 25, 2016

(65) Prior Publication Data
US 2017/0267026 A1    Sep. 21, 2017

(51) Int. Cl.
*B60C 5/14*  (2006.01)
*B60C 1/00*  (2006.01)
(Continued)

(52) U.S. Cl.
CPC .............. *B60C 1/0008* (2013.01); *B60C 5/14* (2013.01); *C08K 3/013* (2018.01); *C08K 3/04* (2013.01);
(Continued)

(58) Field of Classification Search
CPC .. B60C 1/00; B60C 1/008; B60C 5/14; B60C 5/142; B60C 2005/145; B60C 2005/147
See application file for complete search history.

(56) References Cited

U.S. PATENT DOCUMENTS 7,425,591 B2 * 9/2008 Dias ................. C08L 21/00
                                                524/427
8,119,725 B2 * 2/2012 Lustiger ............ B29C 45/0005
                                                264/164
(Continued)

FOREIGN PATENT DOCUMENTS

AU       8547002     *  3/1986
CN      100419014        9/2008
(Continued)

OTHER PUBLICATIONS

International Search Report for International Application No. PCT/JP2014/072059 dated Nov. 25, 2014, 4 pages, Japan.

*Primary Examiner* — Justin R Fischer
(74) *Attorney, Agent, or Firm* — Thorpe North & Western

(57) ABSTRACT

A heavy duty pneumatic tire comprises an innerliner including a laminated first liner and second liner; a thickness of the first liner being 1.2 to 1.9 mm; a thickness of the second liner being 1.2 to 1.6 mm; a total thickness of the first and second liners being 2.4 to 3.4 mm; the first and second liners being made of rubber compositions 1 and 2; rubber composition 1 containing 5 to 50 parts by weight of a plate-like inorganic filler having a particle size of 4.9 to 7.5 μm and an aspect ratio of 3.0 to 7.0 per 100 parts by weight of a diene rubber containing 50 to 100 wt. % of butyl rubber; and rubber composition 2 containing 0.05 to 0.5 parts by weight of an organic metal salt as metal content per 100 parts by weight of a diene rubber containing at least 50 wt. % of natural rubber.

2 Claims, 1 Drawing Sheet

(51) Int. Cl.
*C08K 3/013* (2018.01)
*C08K 3/34* (2006.01)
*C08K 3/04* (2006.01)
*C08K 5/098* (2006.01)
*C08L 7/00* (2006.01)
*C08L 15/00* (2006.01)
*C09C 1/48* (2006.01)

(52) U.S. Cl.
CPC ............ *C08K 3/346* (2013.01); *C08K 5/098* (2013.01); *C08L 7/00* (2013.01); *C08L 15/00* (2013.01); *C09C 1/482* (2013.01); *B60C 2005/145* (2013.01); *B60C 2200/06* (2013.01); *C08K 2201/005* (2013.01); *C08K 2201/006* (2013.01); *C08K 2201/016* (2013.01)

(56) References Cited

U.S. PATENT DOCUMENTS 8,397,776 B2 * 3/2013 Frank .................. B60C 1/0008
152/510

| | | | |
|---|---|---|---|
| 2006/0270775 | A1 | 11/2006 | Miyazaki |
| 2008/0097021 | A1 | 4/2008 | Krueger |
| 2009/0088532 | A1 | 4/2009 | Choi et al. |
| 2010/0249278 | A1 | 9/2010 | Miyazaki |
| 2014/0116594 | A1* | 5/2014 | Miyazaki .............. B60C 1/0008 152/510 |

FOREIGN PATENT DOCUMENTS

| | | |
|---|---|---|
| CN | 101402746 | 4/2009 |
| JP | S64-022942 | 1/1989 |
| JP | H11-059120 | 3/1999 |
| JP | 2008-528739 | 7/2008 |
| JP | 2009-138135 | 6/2009 |
| JP | 2009-138148 | 6/2009 |
| JP | 2011-168666 | 9/2011 |
| JP | 2012-101751 | 5/2012 |
| JP | 2012-121302 | 6/2012 |
| JP | 2014-031405 | 2/2014 |
| WO | WO 2006/079404 | 8/2006 |
| WO | WO 2009/075127 | 6/2009 |

* cited by examiner

HEAVY DUTY PNEUMATIC TIRE

TECHNICAL FIELD

The present technology relates to a heavy duty pneumatic tire which reduces tire weight while ensuring air permeation prevention performance and durability.

BACKGROUND ART

In recent years, as can be seen in the introduction of labeling systems and the like, there has been a demand to reduce the rolling resistance of pneumatic tire. Techniques for reducing rolling resistance include securing the proper air pressure by suppressing decreases in internal tire pressure over time, and reducing the tire weight.

The suppression of decreases in internal tire pressure can be achieved by increasing the thickness of the innerliner so as to enhance the air permeation prevention performance, but the tire weight increases as a result. When the tire weight increases, the rolling resistance becomes poor.

Japanese Unexamined Patent Application Publication No. 2009-138135A proposes enhancing air permeation resistance and reducing rolling resistance with a rubber composition for an innerliner containing mica having an average particle size of from 25 to 100 μm and an aspect ratio of from 25 to 100.

However, inorganic fillers such as mica have a large specific gravity, so there is a problem in that the tire weight and rolling resistance increase. When the innerliner is made thin in order to suppress increases in tire weight, there is a problem in that the air permeation prevention performance decreases or the tire durability decreases. Therefore, a pneumatic tire that achieves good air permeation prevention performance, good durability, and reduced tire weight in a compatible manner has not yet been established.

SUMMARY

The present technology provides a heavy duty pneumatic tire which reduces tire weight while ensuring air permeation prevention performance and durability.

The heavy duty pneumatic tire of the present technology comprises:

an innerliner including a laminated first liner and second liner;

a thickness of the first liner being from 1.2 to 1.9 mm; a thickness of the second liner being from 1.2 to 1.6 mm; a total thickness of the first and second liners being from 2.4 to 3.4 mm; the first liner being made of a rubber composition 1; the second liner being made of a rubber composition 2; the first rubber composition containing from 5 to 50 parts by weight of a plate-like inorganic filler having a particle size of from 4.9 to 7.5 μm and an aspect ratio Ar of from 3.0 to 7.0 per 100 parts by weight of a diene rubber containing from 50 to 100 wt. % of a butyl rubber; and the second rubber composition containing from 0.05 to 0.5 parts by weight of an organic metal salt as metal content per 100 parts by weight of a diene rubber containing not less than 50 wt. % of a natural rubber.

The heavy duty pneumatic tire of the present technology includes an innerliner including the laminated first liner, which is formed from a rubber composition 1 made of a butyl rubber and a plate-like inorganic filler having specific particle properties, and second liner, which is formed from a rubber composition 2 made of a natural rubber and an organic metal salt, wherein the thickness of the first liner is from 1.2 to 1.9 mm, the thickness of the second liner is from 1.2 to 1.6 mm, and the total thickness of the first and second liners is from 2.4 to 3.4 mm. Therefore, it is possible to reduce the tire weight while ensuring the air permeation prevention performance and durability of the pneumatic tire.

The aspect ratio Ar can be measured using the following Formula (1).

$$Ar=(Ds-Dl)/Ds \quad (1)$$

(In the formula, Ar is the aspect ratio, Ds is the 50% particle size determined from the cumulative distribution measured by centrifugal sedimentation, and Dl is the 50% particle size determined from the cumulative distribution measured by laser diffraction of coherent light.)

Talc is preferable as a plate-like inorganic filler. Further, the rubber composition 1 preferably contains from 10 to 70 parts by weight of carbon black having a nitrogen adsorption specific surface area of from 29 to 43 $m^2/g$ per 100 parts by weight of the diene rubber.

DETAILED DESCRIPTION

Figure 1:
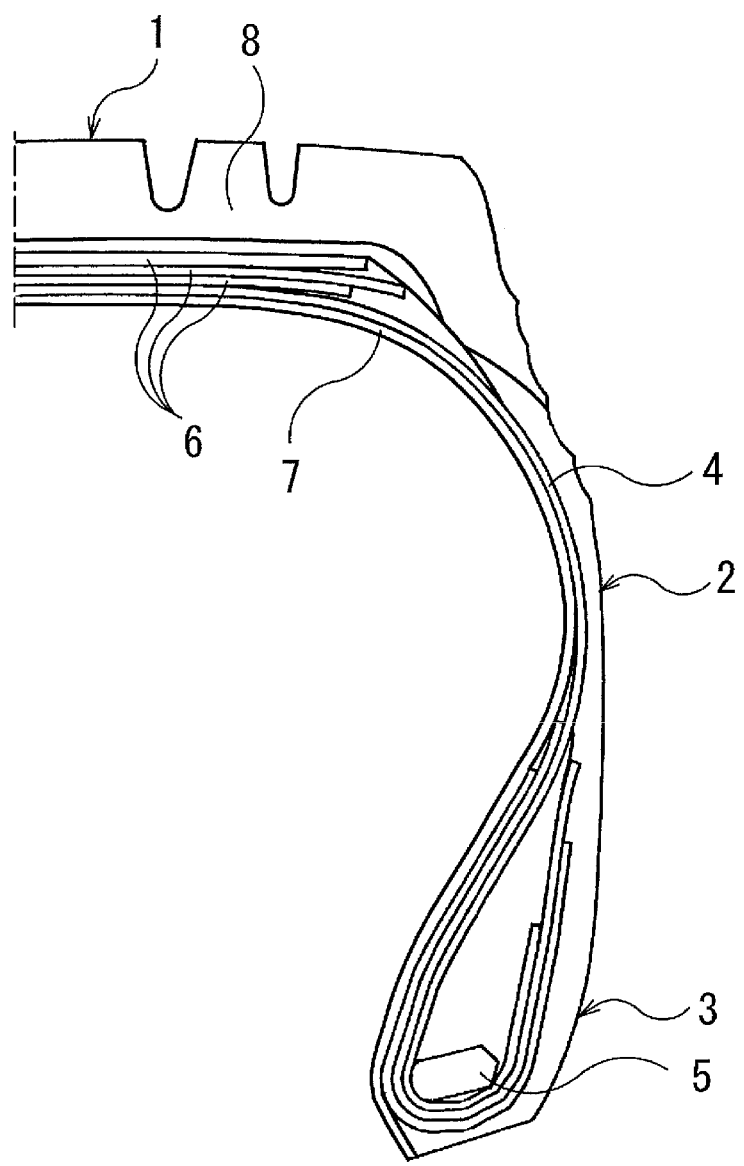
FIG. 1 is a cross-sectional view in a meridian direction illustrating an example of an embodiment of a heavy-load pneumatic tire of the present technology.

In this specification, a heavy duty pneumatic tire refers to a pneumatic tire used on a large vehicle such as a truck or a bus. As illustrated in FIG. 1, a heavy duty pneumatic tire comprises a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 with a three-layer structure is disposed outward in the tire radial direction of the carcass layer 4 in the tread portion 1, and a tread rubber 8 is disposed outward of the belt layer 6 on the outermost side. An innerliner layer 7 is disposed on the innermost side of the tire.

Figure 2:
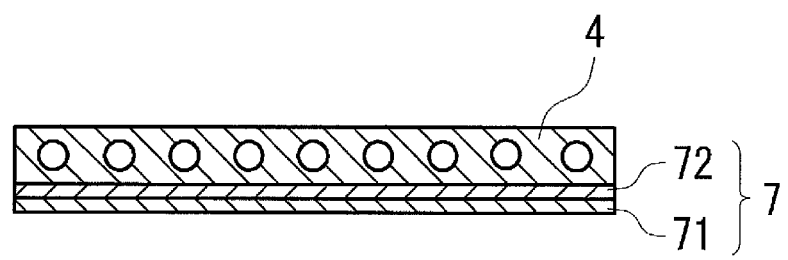
FIG. 2 is a magnified cross-sectional view in the meridian direction illustrating an example of an embodiment of an innerliner and a carcass layer constituting the heavy duty pneumatic tire of the present technology.

As illustrated in FIG. 2, the innerliner 7 constituting the heavy duty pneumatic tire of the present technology is formed by laminating a first liner 71 and a second liner 72. In the configuration of the innerliner 7, the first liner 71 may be disposed on the inner cavity side of the tire, and the second liner 72 may be disposed on the side of the adjacent carcass layer 4. The first liner 71 is formed from a rubber composition 1 made of a butyl rubber and a plate-like inorganic filler having specific particle properties, and the second liner 72 is formed from a rubber composition 2 made of a natural rubber and an organic metal salt. In addition, the thickness of the first liner 71 is from 1.2 to 1.9 mm in the center of the tread portion 1, and the thickness of the second liner 72 is from 1.2 to 1.6 mm in the center of the tread portion 1. The total thickness of the first liner 71 and the second liner 72—that is, the thickness of the innerliner—is from 2.4 to 3.4 mm. By forming the innerliner 7 in this way, it is possible to reduce the tire weight while ensuring the air permeation prevention performance and durability of the pneumatic tire.

The thickness of the first liner 71 is from 1.2 to 1.9 mm and preferably from 1.3 to 1.8 mm in the center of the tread portion 1. By making the thickness of the first liner small within such a range, it is possible to prevent the carcass layer from encroaching on the innerliner at the time of vulcanization, even if the thickness of the adjacent second liner is made small. By setting the thickness of the first liner to not less than 1.2 mm, it is possible to ensure excellent air permeation protection performance. In addition, by setting the thickness of the first liner to not greater than 1.9 mm, it is possible to suppress increases in tire weight and to keep the rolling resistance low.

The thickness of the second liner 72 is from 1.2 to 1.6 mm and preferably from 1.3 to 1.5 mm in the center of the tread portion 1. By setting the thickness of the second liner to not less than 1.2 mm, it is possible to prevent the carcass layer from encroaching on the innerliner and to ensure tire durability. In addition, by setting the thickness of the second liner to not greater than 1.6 mm, it is possible to suppress increases in tire weight and to keep the rolling resistance low.

Further, the total thickness of the first liner 71 and the second liner 72—that is, the thickness of the innerliner 7—is from 2.4 to 3.4 mm and preferably from 2.6 to 3.3 mm. By setting the thickness of the innerliner 7 to not less than 2.4, it is possible to ensure air permeation protection performance and tire durability. In addition, by setting the thickness of the innerliner 7 to not greater than 3.4 mm, it is possible to suppress increases in tire weight and to keep the rolling resistance low.

In this specification, the thickness of the first liner 71 and the second liner 72 is obtained by measuring the thickness of the liner at a position in the center of the tread portion 1 from a cross section obtained by cutting the vulcanization-molded pneumatic tire in the meridian direction.

The first liner is a layer molded using the rubber composition 1. The rubber component of the rubber composition 1 is a diene rubber which necessarily contains a butyl rubber. The butyl rubber content is from 50 to 100 wt. % and preferably from 80 to 100 wt. % out of 100 wt. % of the diene rubber. By setting the butyl rubber content to not less than 50 wt. %, it is possible to ensure air permeation protection performance. Note that in this specification, it is assumed that the butyl rubber is contained in the diene rubber.

The rubber composition 1 may contain a diene rubber other than a butyl rubber. Examples of other diene rubbers that may be contained in the rubber composition 1 include natural rubber, isoprene rubber, butadiene rubber, styrene-butadiene rubber, and acrylonitrile-butadiene rubber.

The rubber composition 1 necessarily contains a plate-like inorganic filler having a particle size of from 4.9 to 7.5 μm and an aspect ratio Ar of from 3.0 to 7.0 compounded with the diene rubber. By compounding such a plate-like inorganic filler, it is possible to ensure even better air permeation prevention performance.

The compounded amount of the plate-like inorganic filler is from 5 to 50 parts by weight, preferably from 10 to 40 parts by weight, and more preferably from 15 to 30 parts by weight per 100 parts by weight of the diene rubber. By setting the compounded amount of the plate-like inorganic filler to not less than 5 parts by weight, it is possible to enhance the air permeation prevention performance. In addition, by setting the compounded amount of the plate-like inorganic filler to not greater than 50 parts by weight, it is possible to suppress increases in weight when a tire is produced.

The particle size of the plate-like inorganic filler is from 4.9 to 7.5 μm and preferably from 5.5 to 7.1 μm. By setting the particle size of the plate-like inorganic filler to not less than 4.9 μm, it is possible to obtain a plate-like inorganic filler having excellent air permeation resistance in the rubber composition. In addition, by setting the particle size of the plate-like inorganic filler to not greater than 7.5 μm, it is possible to ensure that the flexural fatigue resistance due to repeated warping in the rubber composition is not diminished. In this specification, the particle size of the plate-like inorganic filler is the median diameter (Dl: particle size of 50% of particles in the particle size cumulative distribution) measured by laser diffraction.

The aspect ratio Ar of the plate-like inorganic filler is from 3.0 to 7.0 and preferably from 3.4 to 5.4. By setting the aspect ratio Ar of the plate-like inorganic filler to not less than 3.0, it is possible to sufficiently suppress air permeability. In addition, by setting the aspect ratio Ar of the plate-like inorganic filler to not greater than 7.0, it is possible to ensure that the flexural fatigue resistance due to repeated warping in the rubber composition is not diminished. The aspect ratio Ar of the plate-like inorganic filler can be measured using the following Formula (1).

$$Ar=(Ds-Dl)/Ds \qquad (1)$$

(In the formula, Ar is the aspect ratio, Ds is the 50% particle size determined from the cumulative distribution measured by centrifugal sedimentation, and Dl is the 50% particle size determined from the cumulative distribution measured by laser diffraction of coherent light.)

The 50% particle size Ds measured by centrifugal sedimentation can be measured, for example, using a SediGraph 5100 particle size measuring device manufactured by Micromeritics Keiki Co., Ltd. In addition, the 50% particle size Dl measured by laser diffraction of coherent light can be measured using a Laser Malvern Mastersizer 2000 diffraction particle size distribution measuring device manufactured by Malvern Instruments, Ltd.

The type of the plate-like inorganic filler is not particularly limited as long as it satisfies the ranges of the particle size and the aspect ratio Ar described above. Examples of plate-like inorganic fillers include flat talc, mica, clay, and bituminous coal. Of these, flat talc is preferable.

A commercially available product can be used as a plate-like inorganic filler, and an example thereof is HAR-talc manufactured by Imerys Co., Ltd.

The rubber composition 1 may contain carbon black. By compounding carbon black, the rubber strength of the rubber composition 1 and the durability when a tire is produced can be enhanced. The carbon black is not particularly limited, but the nitrogen adsorption specific surface area ($N_2SA$) is preferably from 29 to 43 $m^2/g$ and more preferably from 33 to 39 $m^2/g$. By compounding a carbon black having an $N_2SA$ within such a range, it is possible to ensure that the flexural fatigue resistance due to repeated warping in the rubber composition is not diminished. In this specification, the $N_2SA$ of the carbon black is measured in accordance with JIS (Japanese Industrial Standard) K6217-2.

The compounded amount of the carbon black in the rubber composition 1 is preferably from 10 to 70 parts by weight, more preferably from 20 to 60 parts by weight, and even more preferably from 30 to 50 parts by weight per 100 parts by weight of the diene rubber. By setting the compounded amount of the carbon black to not less than 10 parts by weight, it is possible to enhance the rubber strength and tire durability. In addition, by setting the compounded amount of the carbon black to not greater than 70 parts by weight, it is possible to achieve a reinforcing effect without diminishing the flexibility of the rubber composition.

Further, the total compounded amount of the plate-like inorganic filler and the carbon black in the rubber composition 1 is preferably from 15 to 68 parts by weight, more preferably from 30 to 68 parts by weight, and even more preferably from 45 to 65 parts by weight per 100 parts by weight of the diene rubber. By setting the total compounded amount of the plate-like inorganic filler and the carbon black to within such a range, it is possible to suppress increases in weight when a tire is produced while ensuring excellent air permeation prevention performance.

In the heavy duty pneumatic tire of the present technology, the second liner is a layer molded using the rubber composition 2. The rubber component of the rubber composition 2 is a diene rubber which necessarily contains a natural rubber. The natural rubber content is not less than 50 wt. % and preferably from 80 to 100 wt. % out of 100 wt. % of the diene rubber. By setting the natural rubber content to not less than 50 wt. %, it is possible to suppress decreases in breaking strength.

The rubber composition 2 may also contain another diene rubber other than a natural rubber. Examples of other diene rubbers that may be contained in the rubber composition 2 include isoprene rubber, butadiene rubber, styrene-butadiene rubber, and acrylonitrile-butadiene rubber.

The rubber composition 2 necessarily contains an organic metal salt compounded with the diene rubber described above. By compounding an organic metal salt, it is possible to enhance the adhesiveness with the first liner. In addition, the adhesiveness with the adjacent carcass layer can also be enhanced. Further, by increasing the hardness of the rubber composition 2, it is possible to prevent the carcass layer from encroaching on the innerliner. The compounded amount of the organic metal salt is from 0.05 to 0.5 parts by weight and preferably from 0.1 to 0.4 parts by weight per 100 parts by weight of the diene rubber. By compounding not less than 0.05 parts by weight of an organic metal salt in terms of metal content, it is possible to increase the adhesiveness and hardness of the rubber composition 2. In addition, by setting the compounded amount of the organic metal salt in terms of metal content to not greater than 0.5 parts by weight, it is possible to ensure that fatigue resistance due to repeated warping in the rubber composition is not diminished.

Examples of the metal constituting the organic metal salt include cobalt, nickel, chromium, and manganese. Of these, nickel and cobalt are preferable from the perspectives of adhesiveness and hardness. In addition, examples of organic components include naphthenic acid, stearic acid, oleic acid, linoleic acid, linolenic acid, palmitic acid, neodecanoic acid, octylic acid, benzoic acid, acetic acid, methacrylic acid, rosinic acid, tall oil acid, and trineodecanoic acid borate. Examples of organic metal salts that can be used in the present technology include cobalt stearate, cobalt naphthenate, cobalt neodecanoate orthoborate, cobalt oleate, cobalt octylate, cobalt benzoate, cobalt acetate, cobalt methacrylate, tall oil acid cobalt, cobalt rosinate, nickel naphthenate, nickel stearate, nickel octylate, and nickel rosinate.

A commercially available product can be used as an organic metal salt. Specifically, Nosem Nickel (Ni content: 20.04%) manufactured by Nihon Kagaku Sangyo Co., Ltd., cobalt naphthenate 10% (Co content: 10%) manufactured by the DIC Corporation, DICNATE NBC-2 (Co content: 22%) manufactured by the DIC Corporation, Nosem Secondary Cobalt (Co content: 16.54%) manufactured by Nihon Kagaku Sangyo Co., Ltd., or the like may be used.

In the present technology, another filler other than a plate-like inorganic filler may be compounded with the rubber composition 1 and the rubber composition 2. The carbon black described above is preferable as another filler, and examples other than carbon black include calcium carbonate, aluminum hydroxide, aluminum oxide, and titanium oxide. This is because rubber strength can be increased by compounding other fillers, including carbon black. In addition to the substances described above, talc and mica may be compounded with the rubber composition 2.

In the heavy duty pneumatic tire of the present technology, the rubber composition 1 and the rubber composition 2 may also contain various types of additives that are commonly used in rubber compositions for tires, such as vulcanization or crosslinking agents, vulcanization accelerators, anti-aging agents, plasticizers, processing aids, liquid polymers, terpene resins, and thermosetting resins in a range that does not impair the object of the present technology. These additives may be kneaded according to any common method to form the rubber composition and may be used in vulcanization or crosslinking. The compounded amount of these additives may be any conventional amount, as long as the object of the present technology is not impaired. The heavy duty pneumatic tire of the present technology can be produced by mixing each of the components described above using a commonly used rubber kneading machine, such as a Banbury mixer, a kneader, and a roller.

The heavy duty pneumatic tire of the present technology can reduce tire weight while ensuring air permeation prevention performance and tire durability.

The present technology is further explained below using examples. However, the scope of the present technology is not limited to these examples.

EXAMPLES

Preparation and Evaluation of Rubber Compositions 1

As a rubber composition for forming a first liner, the components of five types of rubber compositions 1 with the content shown in Table 1 (rubber compositions 1-1 to 1-5) excluding sulfur and a vulcanization accelerator were kneaded for five minutes at 160° C. with a 1.8 L sealed mixer and then discharged to form a master batch. Sulfur and a vulcanization accelerator were added to the obtained master batch and kneaded with an open roller to prepare five types of rubber compositions 1.

Using the obtained five types of rubber compositions 1, rubber sheets with a width of 15.0 mm and a thickness of 2.0 mm were extrusion-molded and vulcanized. Air permeability tests were performed based on JIS K 7126 using the obtained vulcanized sheets. The obtained results are shown in the "air permeability" row as index values with the value of rubber composition 1-2 defined as 100. Smaller index values of the air permeability indicate superior air permeation prevention performance.

TABLE 1

| | | Rubber composition 1-1 | Rubber composition 1-2 | Rubber composition 1-3 | Rubber composition 1-4 | Rubber composition 1-5 |
|---|---|---|---|---|---|---|
| Butyl rubber | Parts by weight | 100 | 100 | 100 | 100 | 100 |
| Carbon black 1 | Parts by weight | 40 | 60 | 50 | 30 | 40 |
| Talc 1 | Parts by weight | 20 | | 10 | 30 | |
| Talc 2 | Parts by weight | | | | | 20 |
| Zinc oxide | Part by weight | 3 | 3 | 3 | 3 | 3 |
| Stearic acid | Parts by weight | 1 | 1 | 1 | 1 | 1 |
| Anti-aging agent | Parts by weight | 0 | 0 | 0 | 0 | 0 |
| Sulfur | Part by weight | 0.5 | 0.5 | 0.5 | 0.5 | 0.5 |
| Vulcanization accelerator | Parts by weight | 1.0 | 1.0 | 1.0 | 1.0 | 1.0 |
| Air permeability | Index value | 60 | 100 | 67 | 53 | 72 |

The types of raw materials used as in Table 1 are described below.

Butyl rubber: Bromobutyl manufactured by Lanxess
Carbon black 1: Niteron # GN manufactured by NSCC Carbon Co., Ltd., GPF grade, nitrogen adsorption specific surface area $(N_2SA)=33$ m$^2$/g
Talc 1: HARtalc manufactured by Imerys Co., Ltd., particle size=5.7 μm, aspect ratio Ar=4.7
Talc 2: Mistron Vapor manufactured by Mistron Japan Co., Ltd., particle size=4.8 μm, aspect ratio Ar=0.65
Zinc oxide: type III Zinc Oxide, manufactured by Seido Chemical Industry Co., Ltd.
Stearic acid: Stearic Acid YR manufactured by NOF Corp.
Sulfur: oil treated sulfur, manufactured by Hosoi Chemical Industry Co., Ltd.
Vulcanization accelerator: Sanceler DM-PO, manufactured by Sanshin Chemical Industry Co., Ltd.

The particle size of the plate-like inorganic filler (talcs 1 and 2) was measured using a Laser Malvern Mastersizer 2000 diffraction particle size distribution measuring device manufactured by Malvern Instruments, Ltd. In addition, the aspect ratio Ar of the plate-like inorganic filler (talcs 1 and 2) was determined by measuring the 50% particle size Ds by centrifugal sedimentation using a SediGraph 5100 particle size measuring device manufactured by Micromeritics Keiki Co., Ltd. and measuring the 50% particle size Dl using a Laser Malvern Mastersizer 2000 diffraction particle size distribution measuring device manufactured by Malvern Instruments, Ltd, and solving for Formula (1) below.

$$Ar=(Ds-Dl)/Ds \quad (1)$$

(In the formula, Ar is the aspect ratio, Ds is the 50% particle size determined from the cumulative distribution measured by centrifugal sedimentation, and Dl is the 50% particle size determined from the cumulative distribution measured by laser diffraction of coherent light.)

Preparation and Evaluation of Rubber Composition 2

As a rubber composition for forming a second liner, the components of four types of rubber compositions 2 with the content shown in Table 2 (rubber compositions 2-1 to 2-4) excluding sulfur and a vulcanization accelerator were kneaded for five minutes at 160° C. with a 1.8 L sealed mixer and then discharged to form a master batch. Sulfur and a vulcanization accelerator were added to the obtained master batch and kneaded with an open roller to prepare four types of rubber compositions 2. For the organic metal salt 1 and the organic metal salt 2, the compounded amount in terms of the metal content with respect to 100 parts by weight of the diene rubber is shown in the "metal content" column of Table 2.

Using the obtained four types of rubber compositions 2, rubber sheets with a width of 15.0 mm and a thickness of 2.0 mm were extrusion-molded and vulcanized. Rubber hardness and adhesiveness tests were performed with the following methods using the obtained vulcanized sheets.

Rubber Hardness

Using the obtained vulcanized sheets, the rubber hardness was measured at a temperature of 25° C. with a type A durometer in accordance with JIS K6253. The obtained results are shown in the "rubber hardness" row as index values with the value of rubber composition 2-2 defined as 100. Larger index values of rubber hardness indicate superior tire durability.

Adhesiveness

Using the obtained vulcanized sheets, the adhesiveness was measured under conditions of a temperature of 23° C. and 60% humidity in accordance with JIS K6253. The obtained results are shown in the "adhesiveness" row as index values with the value of rubber composition 2-2 defined as 100. Larger index values of adhesiveness indicate superior processability.

TABLE 2

| | | Rubber composition 2-1 | Rubber composition 2-2 | Rubber composition 2-3 | Rubber composition 2-4 |
|---|---|---|---|---|---|
| Natural rubber | Parts by weight | 100 | 100 | 100 | 100 |
| Carbon black 2 | Parts by weight | 50 | 50 | 50 | 30 |
| Organic metal salt 1 | Parts by weight | 1.0 | | 4.0 | |

TABLE 2-continued

|  |  | Rubber composition 2-1 | Rubber composition 2-2 | Rubber composition 2-3 | Rubber composition 2-4 |
|---|---|---|---|---|---|
| Organic metal salt 2 | Parts by weight |  |  |  | 0.45 |
| Zinc oxide | Part by weight | 10 | 10 | 10 | 10 |
| Stearic acid | Parts by weight |  |  |  |  |
| Anti-aging agent | Parts by weight | 3 | 3 | 3 | 3 |
| Sulfur | Part by weight | 6 | 6 | 6 | 6 |
| Vulcanization accelerator | Parts by weight | 0.5 | 0.5 | 0.5 | 0.5 |
| Metal content | (Parts by weight) | (0.1) |  | (0.4) | (0.1) |
| Rubber hardness | Index value | 105 | 100 | 122 | 103 |
| Adhesiveness | Index value | 114 | 100 | 154 | 114 |

The types of raw materials used as in Table 2 are described below.

Natural rubber: TSR20

Carbon black 2: Seast 300 manufactured by Tokai Carbon Co., Ltd., HAF grade, nitrogen adsorption specific surface area ($N_2SA$)=77 m$^2$/g Organic metal salt 1: cobalt naphthenate, cobalt content: 10.0 wt. %, cobalt naphthenate 10% manufactured by the DIC Corporation Organic metal salt 2: cobalt neodecanoate borate, cobalt content: 22.0 wt. %, DICNATE NBC-2 manufactured by the DIC Corporation Zinc oxide: Ginrei R manufactured by Toho Zinc Co., Ltd.

Anti-aging agent: OZONONE 6C, manufactured by Seiko Chemical Co., Ltd.

Sulfur: Crystex HS OT 20 manufactured by Flexsys

Vulcanization accelerator: NOCCELER DZ-G, manufactured by Ouchi Shinko Chemical Industrial Co., Ltd.

Next, the five types of rubber compositions 1 (rubber compositions 1-1 to 1-5) and the four types of rubber compositions 2 (rubber compositions 2-1 to 2-4) obtained above were combined as shown in Tables 3 to 5, passed through two extrusion molding devices and molded into sheets having the respectively prescribed thicknesses, and laminated and molded into unvulcanized innerliners. The weight of each of the obtained innerliners per unit length was measured.

Using the obtained innerliners, 14 types of heavy duty pneumatic tires with a tire size of 275/70R22.5 (Examples 1 to 7 and Comparative Examples 1 to 7) were vulcanization-molded. The produced heavy duty pneumatic tires were cut in the meridian direction, and the thickness of the innerliner comprising the first and second liners was measured. The obtained results are shown in Tables 3 to 5.

Using the produced heavy duty pneumatic tires, air leakage and tire durability tests were performed with the following methods.

Air Leakage

An obtained heavy duty pneumatic tire was mounted on a standard rim, and air containing 70% oxygen was sealed therein at a pressure of 900 kPa. The tire was placed in a dry heating oven at 70° C. The changes in air pressure were measured for 60 days, and the slope of air pressure changes over time was measured. The obtained results are shown in the "air leakage" row as index values with the value of Comparative Example 1 defined as 100. Smaller index values of air leakage indicate superior air permeation prevention performance.

Tire Durability

An obtained heavy duty pneumatic tire was mounted on a standard rim and filled to an air pressure of 900 kPa as prescribed by JATMA. The tire was placed in an indoor drum tester (drum diameter: 1707 mm) compliant with JIS D4230, and 140% of the load prescribed by JATMA was applied. The travel distance until tire failure was measured under conditions with a speed of 45 km/h. The obtained results are shown in the "tire durability" row as index values with the value of Comparative Example 1 defined as 100. Larger index values for tire durability indicate a longer travel distance and superior tire durability.

TABLE 3

|  |  |  | Comparative Example 1 | Example 1 | Example 2 | Example 3 | Example 4 |
|---|---|---|---|---|---|---|---|
| First liner | First liner thickness | mm | 2.0 | 1.6 | 1.2 | 1.2 | 1.6 |
|  | Type of rubber composition 1 | — | Rubber composition 1-2 | Rubber composition 1-1 | Rubber composition 1-1 | Rubber composition 1-1 | Rubber composition 1-3 |
| Second liner | Second liner thickness | mm | 1.6 | 1.3 | 1.6 | 1.2 | 1.3 |
|  | Type of rubber composition 2 | — | Rubber composition 2-1 | Rubber composition 2-1 | Rubber composition 2-1 | Rubber composition 2-1 | Rubber composition 2-1 |
| Total thickness of first and second liners |  | mm | 3.6 | 2.9 | 2.8 | 2.4 | 2.9 |
| Innerliner weight |  | Index value | 100 | 83 | 84 | 73 | 81 |
| Air leakage |  | Index value | 100 | 89 | 96 | 98 | 96 |
| Tire durability |  | Index value | 100 | 106 | 102 | 101 | 103 |

TABLE 4

|  |  |  | Example 5 | Example 6 | Example 7 | Comparative Example 2 | Comparative Example 3 |
|---|---|---|---|---|---|---|---|
| First liner | First liner thickness | mm | 1.6 | 1.6 | 1.6 | 1.9 | 2.0 |
|  | Type of rubber composition 1 | — | Rubber composition 1-4 | Rubber composition 1-1 | Rubber composition 1-1 | Rubber composition 1-1 | Rubber composition 1-1 |
| Second liner | Second liner thickness | mm | 1.3 | 1.3 | 1.3 | 1.6 | 1.8 |
|  | Type of rubber composition 2 | — | Rubber composition 2-1 | Rubber composition 2-3 | Rubber composition 2-4 | Rubber composition 2-1 | Rubber composition 2-1 |
| Total thickness of first and second liners |  | mm | 2.9 | 2.9 | 2.9 | 3.5 | 3.8 |
| Innerliner weight |  | Index value | 86 | 87 | 82 | 100 | 104 |
| Air leakage |  | Index value | 76 | 86 | 86 | 82 | 80 |
| Tire durability |  | Index value | 125 | 106 | 104 | 110 | 115 |

TABLE 5

|  |  |  | Comparative Example 4 | Comparative Example 5 | Comparative Example 6 | Comparative Example 7 |
|---|---|---|---|---|---|---|
| First liner | First liner thickness | mm | 1.9 | 1.9 | 1.6 | 1.6 |
|  | Type of rubber composition 1 | — | Rubber composition 1-1 | Rubber composition 1-1 | Rubber composition 1-1 | Rubber composition 1-5 |
| Second liner | Second liner thickness | mm | 1.1 | 1.7 | 1.3 | 1.3 |
|  | Type of rubber composition 2 | — | Rubber composition 2-1 | Rubber composition 2-1 | Rubber composition 2-2 | Rubber composition 2-1 |
| Total thickness of first and second liners |  | mm | 3.0 | 3.6 | 2.9 | 2.9 |
| Innerliner weight |  | Index value | 84 | 103 | 83 | 83 |
| Air leakage |  | Index value | 86 | 86 | 92 | 111 |
| Tire durability |  | Index value | 60 | 109 | 50 | 87 |

As is clear from Tables 3 and 4, it was confirmed that the heavy duty pneumatic tires of Examples 1 to 7 can reduce tire weight while enhancing the air permeation prevention performance and tire durability to or beyond conventional levels.

As is clear from Table 4, the heavy duty pneumatic tire of Comparative Example 2 is unable to reduce tire weight since the total thickness of the first and second liners exceeds 3.4 mm. The heavy duty pneumatic tire of Comparative Example 3 is unable to reduce tire weight since the thickness of the first liner exceeds 1.9 mm, the thickness of the second liner exceeds 1.6 mm, and the total thickness of the first and second liners exceeds 3.4 mm.

In addition, as is clear from Table 5, the heavy duty pneumatic tire of Comparative Example 4 has inferior tire durability since the thickness of the second liner is less than 1.2 mm. The heavy duty pneumatic tire of Comparative Example 5 is unable to reduce tire weight since the thickness of the second liner exceeds 1.6 mm.

The heavy duty pneumatic tire of Comparative Example 6 has inferior tire durability since the second liner is molded from rubber composition 2-2 which does not contain an organic metal salt.

The heavy duty pneumatic tire of Comparative Example 7 has poor air leakage in the tire since the first liner is molded from rubber composition 1-5 containing talc 2 having an aspect ratio Ar of less than 2.4.

The invention claimed is:
1. A heavy duty pneumatic tire, comprising:
   an innerliner including a laminated first liner and second liner;
   a thickness of the first liner being from 1.2 to 1.9 mm; a thickness of the second liner being from 1.2 to 1.6 mm;
   a total thickness of the first and second liners being from 2.4 to 3.4 mm;
   the first liner being made of a first rubber composition;
   the second liner being made of a second rubber composition;
   the first rubber composition containing from 5 to 50 parts by weight of a plate-like inorganic filler having a particle size of from 4.9 to 7.5 μm and an aspect ratio Ar of from 3.0 to 7.0 per 100 parts by weight of a diene rubber containing from 50 to 100 wt. % of a butyl rubber, the plate-like inorganic filler being talc, wherein the aspect ratio Ar is measured using Ar=(Ds−Dl)/Ds (1), where Ds is a 50% particle size determined from a cumulative distribution measured by centrifugal sedimentation, and Dl is a 50% particle size determined from a cumulative distribution measured by laser diffraction of coherent light;

the first rubber composition containing from 10 to 70 parts by weight of carbon black having a nitrogen adsorption specific surface area of from 29 to 43 m²/g per 100 parts by weight of the diene rubber; and the second rubber composition containing from 0.05 to 0.5 parts by weight of an organic metal salt as metal content per 100 parts by weight of a diene rubber containing not less than 50 wt. % of a natural rubber;

wherein when the first rubber composition contains an other diene rubber in addition to the butyl rubber, the other diene rubber consists of at least one rubber selected from the group consisting of: natural rubber, isoprene rubber, butadiene rubber, styrene-butadiene rubber, and acrylonitrile-butadiene rubber.

2. The heavy duty pneumatic tire according to claim 1, wherein the first rubber composition contains a total of from 15 to 68 parts by weight of the plate-like inorganic filler and carbon black.

* * * * *